United States Patent
Jung et al.

(10) Patent No.: US 9,503,503 B2
(45) Date of Patent: Nov. 22, 2016

(54) METHOD, USER TERMINAL, AND WEB SERVER FOR PROVIDING SERVICE AMONG HETEROGENEOUS SERVICES

(71) Applicant: ELECTRONICS AND TELECOMMUNICATIONS RESEARCH INSTITUTE, Daejeon (KR)

(72) Inventors: Il Gu Jung, Daejeon (KR); Chang Woo Yoon, Daejeon (KR); Jun Kyun Choi, Daejeon (KR); Jin Hong Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 365 days.

(21) Appl. No.: 14/205,850

(22) Filed: Mar. 12, 2014

(65) Prior Publication Data

US 2014/0280196 A1 Sep. 18, 2014

(30) Foreign Application Priority Data

Mar. 12, 2013 (KR) .................. 10-2013-0026383

(51) Int. Cl.
*H04L 29/08* (2006.01)
*G06F 17/30* (2006.01)
*H04L 29/06* (2006.01)

(52) U.S. Cl.
CPC ......... *H04L 67/02* (2013.01); *G06F 17/30893* (2013.01); *H04L 63/062* (2013.01); *H04L 63/10* (2013.01)

(58) Field of Classification Search
CPC ..... H04L 67/02; H04L 63/10; H04L 63/062; G06F 17/30893

USPC ......................................... 707/741
See application file for complete search history.

(56) References Cited

U.S. PATENT DOCUMENTS

| | | | | |
|---|---|---|---|---|
| 7,197,144 B1 * | 3/2007 | Casagrande | ............ | G06F 21/10 380/262 |
| 7,289,964 B1 * | 10/2007 | Bowman-Amuah | ................. | G06F 9/5038 705/1.1 |
| 7,836,303 B2 * | 11/2010 | Levy | ..................... | H04L 63/102 709/203 |

(Continued)

FOREIGN PATENT DOCUMENTS

KR 10-2010-0050592 5/2010
KR 10-2011-0067787 A 6/2011

OTHER PUBLICATIONS

Kang-Keun Lee, Jin-Young Choi, "A Study on the Use of the Web Storage HTML5" Graduate School of Computer & Information Technology, Korea University, (2011): pp. 430-433. (In Korean, with English Abstract).

*Primary Examiner* — Phuong Thao Cao
(74) *Attorney, Agent, or Firm* — NSIP Law (57) ABSTRACT

A method of providing a service among heterogeneous services may include verifying whether a second web application associated with an external web service is installed in a user agent, when data of the external web service is requested from a first web application executed in the user agent, requesting key information to be used for accessing the requested data from a first server providing a web service associated with the first web application, when the second web application is installed in the user agent, receiving the key information from the first server, and accessing the requested data existing on the second web application, using the received key information, in the first web application.

10 Claims, 6 Drawing Sheets

(56) References Cited

U.S. PATENT DOCUMENTS

| | | | |
|---|---|---|---|
| 8,965,951 B2* | 2/2015 | Rhim | H04N 21/25891 709/203 |
| 9,009,853 B2* | 4/2015 | Korycki | H04L 67/34 726/29 |
| 9,071,580 B2* | 6/2015 | Pigeon | H04L 63/0435 |
| 9,183,380 B2* | 11/2015 | Qureshi | G06F 21/53 |
| 2003/0182392 A1* | 9/2003 | Kramer | G06F 17/3089 709/217 |
| 2004/0039924 A1* | 2/2004 | Baldwin | G06F 21/53 713/189 |
| 2004/0117170 A1* | 6/2004 | Walsh | H04L 63/0807 703/17 |
| 2005/0050454 A1* | 3/2005 | Jennery | G06F 17/30905 715/235 |
| 2005/0071439 A1* | 3/2005 | Bookman | H04L 63/0428 709/217 |
| 2005/0091309 A1* | 4/2005 | Bookman | H04L 63/0428 709/203 |
| 2006/0080257 A1* | 4/2006 | Vaughan | G06Q 10/10 705/51 |
| 2007/0088831 A1* | 4/2007 | Pallamreddy | H04L 67/02 709/227 |
| 2007/0136579 A1* | 6/2007 | Levy | H04L 63/102 713/168 |
| 2007/0162760 A1* | 7/2007 | Samuelsson | G06F 21/6227 713/182 |
| 2007/0169114 A1* | 7/2007 | Birk Olsen | G06F 8/61 717/174 |
| 2007/0204016 A1* | 8/2007 | Kunz | G06Q 10/06 709/223 |
| 2007/0208862 A1* | 9/2007 | Fox | H04L 67/142 709/227 |
| 2008/0065653 A1* | 3/2008 | Shneur | G06F 17/30292 |
| 2009/0044259 A1* | 2/2009 | Bookman | H04L 63/0428 726/5 |
| 2009/0051962 A1* | 2/2009 | Asai | G06F 3/1205 358/1.15 |
| 2009/0060178 A1* | 3/2009 | Montgomery | G06F 21/6209 380/44 |
| 2009/0204964 A1* | 8/2009 | Foley | G06F 21/53 718/1 |
| 2009/0249448 A1* | 10/2009 | Choi | H04L 63/0815 726/4 |
| 2010/0088518 A1* | 4/2010 | Dottax | G06Q 20/341 713/175 |
| 2010/0235321 A1 | 9/2010 | Shukla et al. | |
| 2010/0313199 A1* | 12/2010 | Chen | G06F 9/5055 717/177 |
| 2011/0125776 A1* | 5/2011 | Roshen | G06F 17/30887 707/769 |
| 2012/0110345 A1* | 5/2012 | Pigeon | H04L 63/0435 713/189 |
| 2012/0227004 A1* | 9/2012 | Madireddi | G06Q 10/06 715/771 |
| 2013/0014126 A1* | 1/2013 | Zana | G06F 9/54 719/313 |
| 2013/0238695 A1* | 9/2013 | Giraud | G06F 9/52 709/203 |
| 2013/0239231 A1* | 9/2013 | Korycki | H04L 67/02 726/29 |
| 2013/0276017 A1* | 10/2013 | Walker | H04N 21/44204 725/25 |
| 2014/0007222 A1* | 1/2014 | Qureshi | G06F 21/10 726/16 |
| 2014/0013101 A1* | 1/2014 | Tanizawa | H04L 9/0838 713/150 |
| 2014/0047413 A1* | 2/2014 | Sheive | H04L 65/403 717/110 |
| 2014/0052986 A1* | 2/2014 | Kanai | H04L 63/0428 713/168 |
| 2014/0059352 A1* | 2/2014 | Haga | H04L 9/0822 713/171 |
| 2014/0122578 A1* | 5/2014 | Lee | H04L 67/02 709/203 |
| 2014/0181518 A1* | 6/2014 | Kim | G06F 21/6281 713/168 |
| 2014/0280196 A1* | 9/2014 | Jung | H04L 67/02 707/741 |
| 2014/0379913 A1* | 12/2014 | Niimura | H04L 67/34 709/225 |
| 2014/0380054 A1* | 12/2014 | Roth | H04L 9/0822 713/171 |

* cited by examiner

METHOD, USER TERMINAL, AND WEB SERVER FOR PROVIDING SERVICE AMONG HETEROGENEOUS SERVICES

CROSS-REFERENCE TO RELATED APPLICATION

This application claims the benefit of Korean Patent Application No. 10-2013-0026383, filed on Mar. 12, 2013, in the Korean Intellectual Property Office, the disclosure of which is incorporated herein by reference.

BACKGROUND

1. Field of the Invention

The present invention relates to technology for providing a web service, and more particularly, to technology for providing a service among heterogeneous web services.

2. Description of the Related Art

Use of web applications is increasing in an environment in which web browser based application services are used. A web application refers to a web-based application written in hypertext mark-up language (HTML) 5, JavaScript, cascading style sheet (CSS), and the like. The web application may also refer to a service installable in a browser through a separate web or an application store. An increase of data used for such web applications may lead to an increase of traffic occurring each time the applications are loaded. Accordingly, in order to prevent such an increase of traffic, browser developers may develop standards for an indexed database (DB) corresponding to a storage for web applications, in the HTML5 standards, and store information to be used for various web applications in a form of key values. In addition, with the spread of device application programming interfaces (APIs) and a web operating system (OS), a web application may provide various functions, for example, a device resource access, and the like, yet to be provided by a conventional browser-based execution model type application. For example, the web application may access resources of a device directly and utilize the resources in a service. However, when users use various web applications, an amount of data of individual web applications may increase. In a case in which data sharding among heterogeneous web services or web applications is required, a cross access function may be suggested when domains are different in terms of a service domain, for example, a uniform resource locator (URL), in a general browser.

Figure 1:
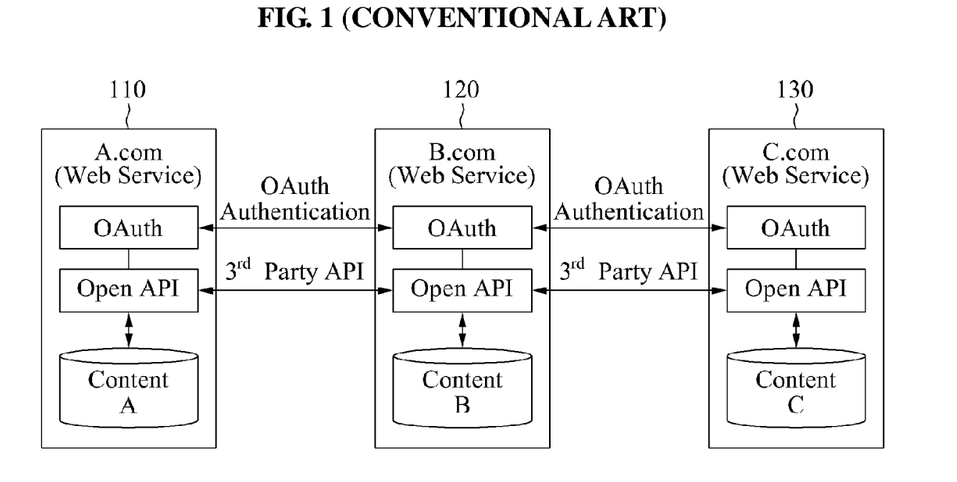
FIG. 1 is a diagram illustrating data sharding among heterogeneous web services according to a conventional art.

FIG. 1 is a diagram illustrating data sharding among heterogeneous web services according to a conventional art.

Referring to FIG. 1, servers 110, 120, and 130 may provide heterogeneous web services, for example, "A.com", "B.com", and "C.com", respectively. In this example, among the web services, an integrated authentication based cross domain data access function through a standard authentication scheme, for example, "OAuth", may be provided in a form of an API. For example, in a case of web services, a separate API may be defined for an access to data of heterogeneous services, and a data sharding function may be provided in a cross domain through mutual user authentication by means of a standardized authentication system, for example, "OAuth". However, in a case of a web application, utilization of the integrated authentication based cross domain data access function may be impossible due to a cross domain issue for security of a browser corresponding to an environment in which the web application is executed. In addition, although the cross domain issue may be resolved through the support of a user agent (UA), additional information, for example, key paths, of an indexed DB used by individual web applications may be necessary.

Figure 2:
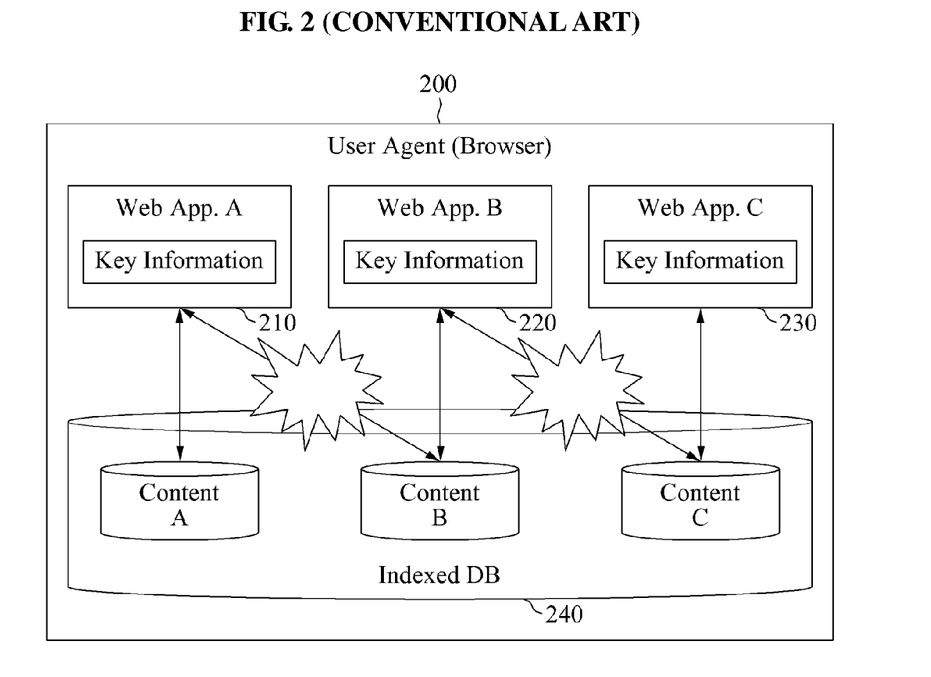
FIG. 2 is a diagram illustrating utilization of an indexed database (DB) in a web application environment according to a conventional art.

FIG. 2 is a diagram illustrating utilization of an indexed DB 240 in a web application environment according to a conventional art.

Referring to FIG. 2, in a UA 200, for example, a browser, a web application A 210, a web application B 220, and a web application C 230 may access content A, content B, and content C, respectively, using key information through the indexed DB 240. However, as an example, since the web application A 210 does not have key information for accessing the content B corresponding to the web application B 220 or the content C corresponding to the web application C 230, a cross domain access may be denied. In particular, although a web application uses an indexed DB to store necessary information, the web application may not utilize data of heterogeneous web applications, due to a cross domain access denied and an absence of key information.

SUMMARY

An aspect of the present invention provides a technology for reducing a processing power and traffic of a web server when a service among heterogeneous services is requested. Simultaneously, another aspect of the present invention also provides a technology for enabling a user to access local data of another service, and increasing a response speed of a service.

According to an aspect of the present invention, there is provided a method of providing a service among heterogeneous services, the method including verifying whether a second web application associated with an external web service is installed in a user agent, when data of the external web service is requested from a first web application executed in the user agent, requesting key information to be used for accessing the requested data from a first server providing a web service associated with the first web application, when the second web application is installed in the user agent, receiving the key information from the first server, and accessing the requested data existing on the second web application, using the received key information, in the first web application.

The key information may be generated by the second web application, transferred to a second server providing the external web service, and delivered from the second server to the first server at a request of the first server.

The verifying may include verifying whether the second web application is installed in the user agent, using a web application list provided by a web application manager included in the user agent.

Whether the web application list is to be provided by the web application manager may be determined based on a user agreement.

According to another aspect of the present invention, there is also provided a method of providing a service among heterogeneous services, the method including generating an indexed database (DB) in a first web application executed in a user agent, confirming key information from the indexed DB and transmitting the confirmed key information to a first server providing a web service associated with the first web application, and extracting data corresponding to the key information from the indexed DB and providing the extracted data to a second web application executed in the user agent, when the data is requested from the second web application using the key information.

The key information may be transferred from the first server to the second web application through a second server providing a web service associated with the second web application.

According to still another aspect of the present invention, there is also provided a user terminal for providing a service among heterogeneous services, the user terminal including a communication unit to communicate externally, and a controller to execute a user agent. The user agent may be configured to verify whether a second web application associated with an external web service is installed in the user agent, when data of the external web service is requested from a first web application executed in the user agent, request key information to be used for accessing the requested data from a first server providing a web service associated with the first web application, when the second web application is installed in the user agent, receive the key information from the first server, and access the requested data existing on the second web application, using the received key information, through the first web application.

According to yet another aspect of the present invention, there is also provided a user terminal for providing a service among heterogeneous services, the user terminal including a communication unit to communicate externally, and a controller to execute a user agent. The user agent may be configured to generate an indexed DB in a first web application executed in the user agent, confirm key information from the indexed DB and transmit the confirmed key information to a first server providing a web service associated with the first web application, and extract data corresponding to the key information from the indexed DB and provide the extracted data to a second web application executed in the user agent, when the data is requested from the second web application using the key information.

According to further another aspect of the present invention, there is also provided a web server for providing a service among heterogeneous services, the web server including a communication unit to communicate with a user terminal, and a controller. The controller may be configured to receive, from the user terminal in which a first web application is installed, key information with respect to data stored in an indexed DB of the first web application, manage the received key information, and transfer the key information corresponding to a request from an external server providing a web service associated with a second web application installed in the user terminal, and the key information transferred to the external server may be transferred to the user terminal and used for accessing the data stored in the indexed DB of the first web application, in the second web application.

According to still another aspect of the present invention, there is also provided a web server for providing a service among heterogeneous services, the web server including a communication unit to communicate with a user terminal, and a controller. The controller may be configured to request key information from an external server providing a web service associated with a second web application, receive the requested key information from the external server, and transfer the received key information to the user terminal, when the key information with respect to data stored in an indexed DB of the second web application installed in the user terminal is requested from the user terminal in which a first web application is installed, and the key information transferred to the user terminal may be used for accessing the data stored in the indexed DB of the second web application, in the first web application.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 3:
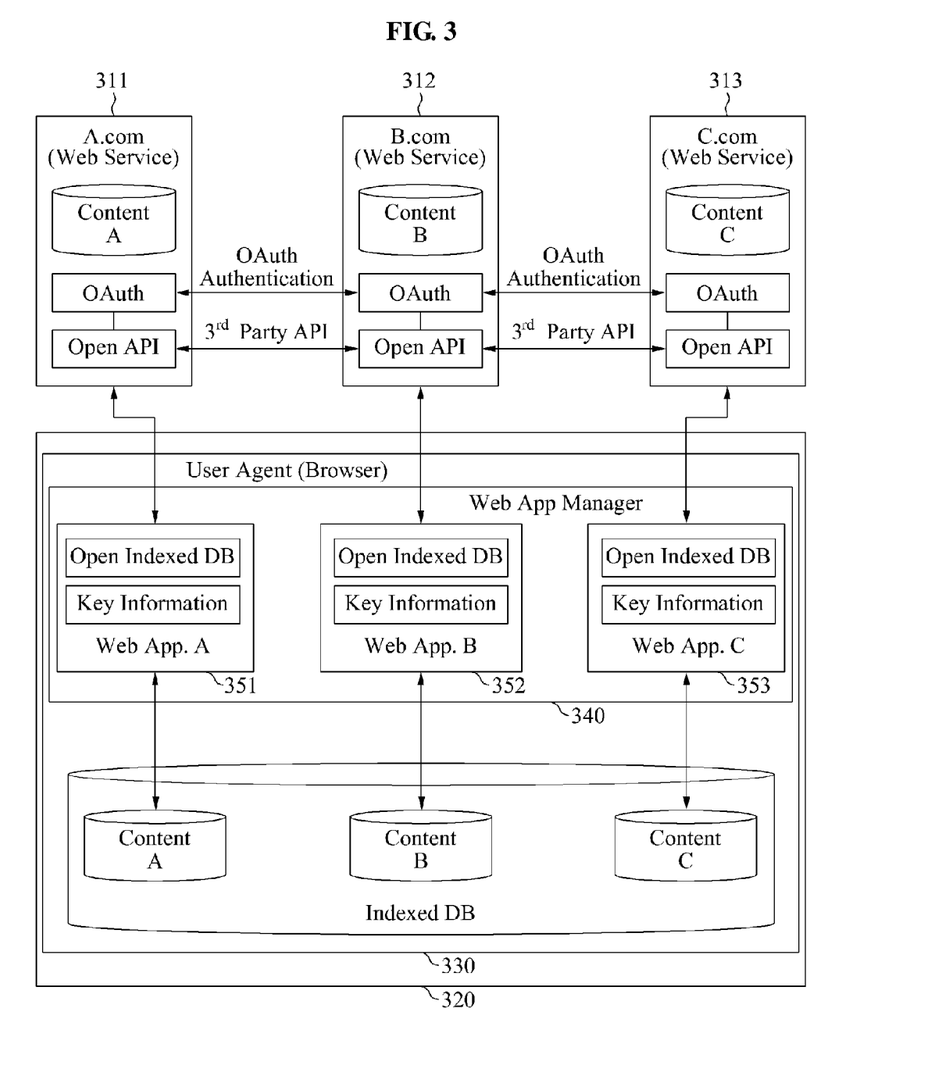
FIG. 3 is a diagram illustrating a system for enabling mutual data to be utilized among heterogeneous web services according to an embodiment of the present invention.

FIG. 3 is a diagram illustrating a system for enabling mutual data to be utilized among heterogeneous web services according to an embodiment of the present invention.

Referring to FIG. 3, the system may include servers 311, 312, and 313 and a user terminal 320. Although not shown in FIG. 3, each of the servers 311, 312, and 313 may include hardware resources including a communication unit to communicate externally and a controller to control the corresponding server. The user terminal 320 may include hardware resources including a communication unit to communicate externally and a controller to control the user terminal 320.

As shown in FIG. 3, the servers 311, 312, and 313 may provide heterogeneous web services, for example, "A.com", "B.com", and "C.com", respectively. The user terminal 320 may include a UA 330, for example, a browser. The UA 330 may be executed and operated by the controller of the user terminal 320. Web applications, for example, a web application manager 340, a web application A 351, a web application B 352, and a web application C 353, may be installed in the user terminal 320. In this example, the UA 330 may further include the web application manager 340, when compared to the UA 200 of FIG. 2. Each of the web applications 351, 352, and 353 may include an open indexed database (DB).

The web application manager 340 may manage information on the web applications installed in the UA 330, using a web application list. In addition, the web application manager 340 may provide the web application list to a web application at a request of the corresponding web application. For example, the web application manager 340 may provide the web application list to the web application A 351 at a request of the web application A 351. The web application list may include information, as shown in Table 1.

TABLE 1

| Identifier | Type | Optional | Description | ExampleValue |
|---|---|---|---|---|
| URL | String | Mandatory | Domain Information | "app.C.com/webapp/" |
| Version | String | Mandatory | Application Version | "1.0" |
| Update | String | Optional | Application Installation/Update Date | "20121201" |
| Title | String | Mandatory | Title Name | "Web Application C" |

The web application manager 340 may provide an API function to provide a service among heterogeneous web applications. The API function may include a function to return information on the web application list through a function "getWebappList( )", a function to return information regarding whether a user access is permitted, through a function "getAcessPermission( )", and the like. The function "getWebappList( )" may return all information on the web application list when a parameter value is absent. In addition, when the parameter value corresponds to a uniform resource locator (URL) or a title, a value of the to URL or the title with respect to web applications in the web application list may be returned. Further, web services or the servers 311, 312, and 313 providing the web services may additionally provide an interface for providing information on an indexed DB requested by web applications.

In FIG. 3, although a description is provided of a structure in which utilization of mutual data among heterogeneous web services is enabled using three web services, for example, "A.com", "B.com", and "C.com", the structure is provided only as an example for ease of description. In particular, it may be obvious to those skilled in the art that a type or a number of web services is not limited to the examples of web services of FIG. 3.

Figure 4:
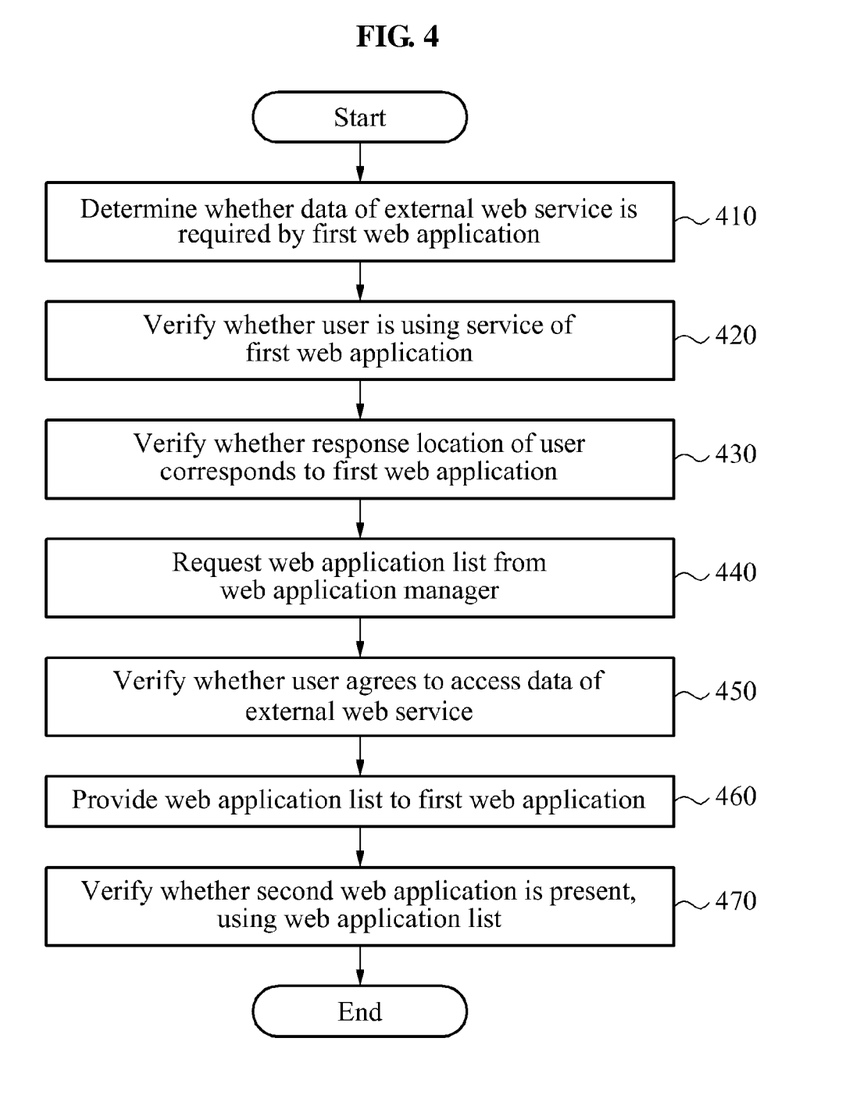
FIG. 4 is a flowchart illustrating a process of verifying whether another web application is installed according to an embodiment of the present invention.
Figure 5:
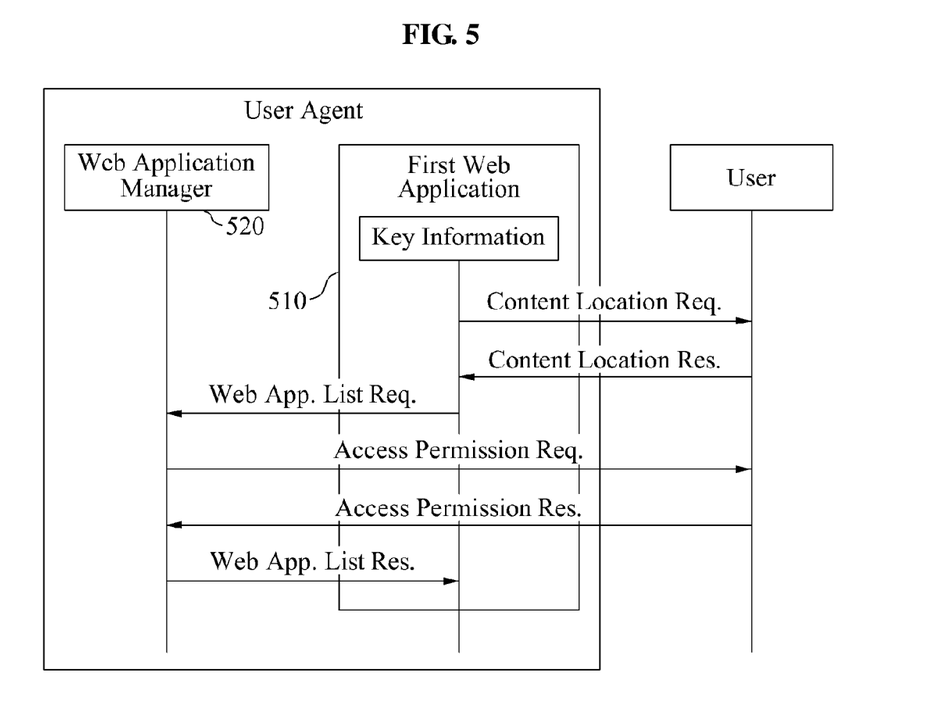
FIG. 5 is a process diagram illustrating information transmitted and received to verify whether another web application is installed according to an embodiment of the present invention.

FIG. 4 is a flowchart illustrating a process of verifying whether another web application is installed according to an embodiment of the present invention, and FIG. 5 is a process diagram illustrating information transmitted and received to verify whether another web application is installed according to an embodiment of the present invention.

The process of FIG. 4 may be performed by a user terminal based on a control of a web application manager, a web application, or a UA installed in the user terminal. The transmitted and received information illustrated in FIG. 5 may include requests and responses transferred among a web application manager, a web application, and a UA in a user terminal.

Referring to FIG. 4, in operation 410, the user terminal may determine whether data of an external web service is required by a first web application, based on a control of the first web application. In operation 420, the user terminal may verify whether a user is using a service of the first web application, based on the control of the first web application. For example, the verifying whether the user is using the service of the first web application may refer to determining whether there is a user using a corresponding web service by verifying whether the user is logged in the corresponding web service. When it is verified that the user is using the service of the first web application, the user terminal may perform operation 430. When it is verified that the user is not using the service of the first web application, the process of FIG. 4 may be terminated. In operation 430, the user terminal may verify whether a response location of the user corresponds to the first web application, based on the control of the first web application.

When it is verified that the response location of the user corresponds to the first web application, the user may perform operation 440. When it is verified that the response location of the user does not correspond to the first web application, the process of FIG. 4 may be terminated. For example, as shown in FIG. 5, a first web application 510 may request a content location from the user. When content is located in another web application installed on a UA, for example, a browser, whether the response location of the user corresponds to the first web application 510 may be verified based on a content location response from the user. Verifying whether the response location of the user corresponds to the first web application 510 may refer to determining whether use of service information is requested through a web application by utilizing information on a UA accessed by the user. The UA information may include, in general, information on a version of the browser, information on an environment of an operating system (OS) being used, and the like. Accordingly, the UA information may be used to verify whether the service is accessed in a form of a web application.

In operation 440, the user terminal may request a web application list from the web application manger, based on the control of the first web application. For example, as shown in FIG. 5, the first web application 510 may request a web application list from a web application manager 520. In this example, the web application list may be requested by the first web application 510 to the web application manager 520 by utilizing an intent scheme dependent on an environment in which the first web application 510 is installed or using an API function of the web application manager 520. In operation 450, the user terminal may verify whether the user agrees on an access to the data of the external web service, based on the control of the web application manager. When it is verified that the user agrees to the access, the user terminal may perform operation 460. When it is verified that the user does not agree to the access, the process of FIG. 4 may be terminated. For example, as shown in FIG. 5, the web application manager 520 may request an agreement on the access to the data of the external web service from the user, and verify whether the user agrees on the access based on an access permission response from the user.

In operation 460, the user terminal may provide the web application list to the first web application, based on the control of the web application manager. For example, as shown in FIG. 5, the web application manger 520 may provide a web application list response to the first web application 510. In operation 470, the user terminal may verify whether a second web application associated with the external web service is present, using the web application list, based on the control of the first web application. As described above, the web application list may include information on web applications installed in the user terminal or the UA. Accordingly, a specific web application installed in the user terminal or the UA may be verified using the web application list.

Figure 6:
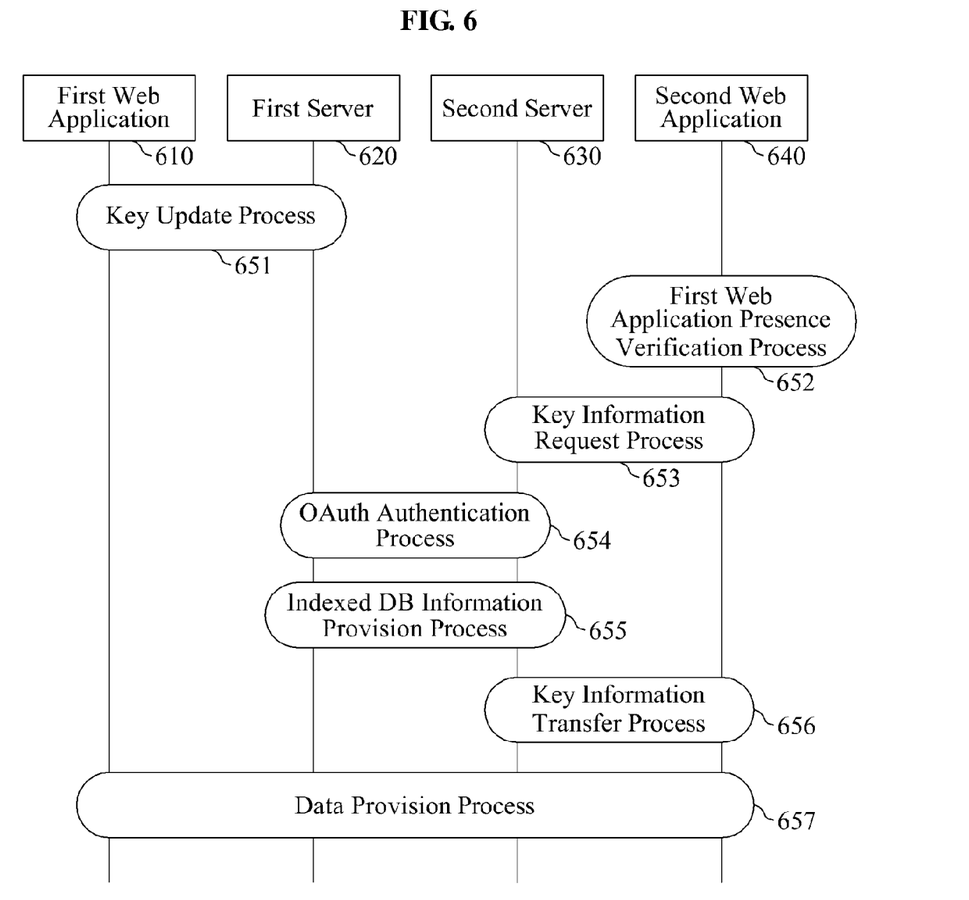
FIG. 6 is a diagram illustrating a scheme of accessing data of heterogeneous services using key information according to an embodiment of the present invention.

FIG. 6 is a diagram illustrating a scheme of accessing data of heterogeneous services using key information according to an embodiment of the present invention.

Referring to FIG. 6, a first web application 610 installed in a user terminal in relation to provision of a first web service may provide key information to a first server 620 providing the first web service, and a second web application 640 installed in the identical user terminal in relation to provision of a second web service may receive the key information through a second server 630 providing the second web service, and utilize data or content (hereinafter, data) of the first web application 610.

For example, the data of the first web application 610 may be stored through a cache in a browser of the user terminal. In this instance, the second web application 640 may access the data of the first web application 610 stored through the cache in the browser, using the key information. Accordingly, traffic for providing data may be reduced from a viewpoint of a service provider, and an access to local data may be enabled and a faster response speed may be expected from a viewpoint of a user.

A key update process 651 may refer to a process in which the first web application 610 transfers the key information to the first server 620 and the first server 620 updates the key information. For example, the first web application 610 may generate an indexed DB, and transmit, to the first server 620, key information for accessing data stored in the indexed DB. The first server 620 may newly generate or update key information with respect to the first web application 610 through use of the received key information. A first web application presence verification process 652 may refer to a process in which the second web application 640 verifies whether the first web application 610 is installed in the user terminal or the UA of the user terminal, or whether the data of the first web application 610 is stored in the cache of the UA or the user terminal. The first web application presence verification process 652 may include the process described with reference to FIGS. 4 and 5. A key information request process 653 may refer to a process in which the second web application 640 requests key information from the second server 630.

An OAuth authentication process 654 may refer to an authentication process performed by the second server 630 with the first server 620 to obtain the key information of the first web application 610, at a request of the second web application 640 for the key information. An indexed DB information provision process 655 may refer to a process in which the second server 630 is provided with the key information from the first server 620. For example, the second server 630 may request an access to the indexed DB from the first server 620. In this example, the first server 620 may perform a procedure for authenticating the request for the access to the indexed DB from the second server 630 through an authentication process. When the request is authenticated, the first server 620 may transmit, to the second server 630, a response indicating that the indexed DB is accessible. Accordingly, the second server 630 may request information on the indexed DB from the first server 620, and the first server 620 may provide, to the second server 630, the key information in response to the request for the information on the indexed DB.

A key information transfer process 656 may refer to a process in which the second server 630 provides the key information to the second web application 640. The second server 630 may transfer, to the second web application 640, the key information received from the first server 620. A data provision process 657 may refer to a process in which the second web application 640 accesses the data stored in the indexed DB of the first web application 610 using the key information. For example, the second web application 640 may request the data from the first web application 610 using the key information, and the first web application 610 receiving the request may provide the data stored in the indexed DB to the second web application 640 based on the key information.

As described above, the first web application 610 and the second web application 640 are programs installed and executed in an identical UA included in a user terminal, and may share data among web applications providing heterogeneous web services through a cache in the UA, for example, a browser. According to embodiments of the present invention, a request for data from another service to a corresponding service may be processed on a UA, without causing traffic of a web server, whereby traffic and a processing power of the server may be reduced from a viewpoint of a service provider. In addition, an access to local data of the other service may be enabled and a faster response speed may be expected from a viewpoint of a user.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing a service among heterogeneous services, the method comprising:
   verifying that a second web application associated with an external web service is installed in a user agent, in response to data of the external web service being requested by a first web application executed in the user agent;
   requesting, from a first server providing a web service associated with the first web application, key information for accessing the requested data in response to the verifying that the second web application is installed in the user agent;
   receiving the key information from the first server; and
   accessing, in the first web application, the requested data of the second web application, using the received key information,
   wherein the key information is generated by the second web application, transferred to a second server providing the external web service, and delivered from the second server to the first server at a request of the first server.

2. The method of claim 1, wherein the verifying comprises verifying that the second web application is installed in the user agent, using a web application list provided by a web application manager included in the user agent.

3. The method of claim 2, wherein the web application list is provided by the web application manager in response to a user agreement.

4. The method of claim 1, wherein:
   an indexed database (DB) is generated by the second web application, and
   the key information is generated to correspond to the data stored in the indexed DB.

5. A method of providing a service among heterogeneous services, the method comprising:
   generating an indexed database (DB) of a first web application executed in a user agent;
   confirming key information from the indexed DB and transmitting the confirmed key information to a first server providing a web service associated with the first web application; and
   extracting data corresponding to the key information from the indexed DB and providing the extracted data to a second web application executed in the user agent, in response to the data being requested by the second web application using the key information,
   wherein the key information is transferred from the first server to the second web application through a second server providing a web service associated with the second web application.

6. A user terminal for providing a service among heterogeneous services, the user terminal comprising:
   a communication unit to communicate externally; and
   a controller to execute a user agent,
   wherein the user agent is configured to:
   verify whether a second web application associated with an external web service is installed in the user agent, when data of the external web service is requested from a first web application executed in the user agent,
   request key information to be used for accessing the requested data from a first server providing a web service associated with the first web application, when the second web application is installed in the user agent,
   receive the key information from the first server, and
   access the requested data existing on the second web application, using the received key information, through the first web application,
   wherein the key information is generated by the second web application, transferred to a second server providing the external web service, and delivered from the second server to the first server at a request of the first server.

7. The user terminal of claim 6, wherein the user agent verifies whether the second web application is installed in the user agent, using a web application list provided by a web application manager included in the user agent.

8. A user terminal for providing a service among heterogeneous services, the user terminal comprising:
   a communication unit to communicate externally; and
   a controller to execute a user agent,
   wherein the user agent is configured to:
   generate an indexed database (DB) of a first web application executed in the user agent,
   confirm key information from the indexed DB and transmit the confirmed key information to a first server providing a web service associated with the first web application, and
   extract data corresponding to the key information from the indexed DB and provide the extracted data to a second web application executed in the user agent, in response to the data being requested by the second web application using the key information,
   wherein the key information is transferred from the first server to the second web application through a second server providing a web service associated with the second web application.

9. A web server for providing a service among heterogeneous services, the web server comprising:
   a communication unit to communicate with a user terminal; and
   a controller,
   wherein:
   the controller is configured to receive, from the user terminal in which a first web application is installed, key information with respect to data stored in an indexed database (DB) of the first web application, manage the received key information, and transfer the key information corresponding to a request from an external server providing a web service associated with a second web application installed in the user terminal, and
   the key information transferred to the external server is transferred to the user terminal and used for accessing the data stored in the indexed DB of the first web application, in the second web application.

10. A web server for providing a service among heterogeneous services, the web server comprising:

a communication unit to communicate with a user terminal; and
a controller,
wherein:
the controller is configured to request key information from an external server providing a web service associated with a second web application, receive the requested key information from the external server, and transfer the received key information to the user terminal, when the key information with respect to data stored in an indexed database (DB) of the second web application installed in the user terminal is requested from the user terminal in which a first web application is installed, and
the key information transferred to the user terminal is used for accessing the data stored in the indexed DB of the second web application, in the first web application.

* * * * *